United States Patent
Zhou et al.

(10) Patent No.: US 12,391,572 B1
(45) Date of Patent: Aug. 19, 2025

(54) PREPARATION METHOD OF MANGANESE IRON PHOSPHATE PRECURSOR, CATHODE SHEET, AND LITHIUM BATTERY

(71) Applicant: Hunan Yuneng new energy battery materials Co., LTD., Xiangtan (CN)

(72) Inventors: Quan Zhou, Xiangtan (CN); Xinqiao Tan, Xiangtan (CN); Wang Zou, Xiangtan (CN); Tao Chen, Xiangtan (CN); Hao Wang, Xiangtan (CN); Qiang Huang, Xiangtan (CN)

(73) Assignee: Hunan Yuneng new energy battery materials Co., LTD., Hunan (CN)

( * ) Notice: Subject to any disclaimer, the term of this patent is extended or adjusted under 35 U.S.C. 154(b) by 0 days.

(21) Appl. No.: 19/015,459

(22) Filed: Jan. 9, 2025

(30) Foreign Application Priority Data

Sep. 5, 2024 (CN) .......................... 202411237937.0

(51) Int. Cl.
| | |
|---|---|
| *C01G 49/00* | (2006.01) |
| *C01B 25/26* | (2006.01) |
| *H01M 4/58* | (2010.01) |
| *H01M 10/052* | (2010.01) |

(52) U.S. Cl.
CPC ............ *C01G 49/009* (2013.01); *C01B 25/26* (2013.01); *H01M 4/58* (2013.01); *H01M 10/052* (2013.01); *C01P 2004/64* (2013.01); *C01P 2006/40* (2013.01)

(58) Field of Classification Search
None
See application file for complete search history.

(56) References Cited

FOREIGN PATENT DOCUMENTS

| | | |
|---|---|---|
| CN | 105870432 A | 8/2016 |
| CN | 105879580 A | 8/2016 |
| CN | 206384847 U | 8/2017 |
| CN | 114025874 A | 2/2022 |

OTHER PUBLICATIONS

Zhou et al., CN 206384847 U, English Translation from FIT (Year: 2017).*

* cited by examiner

*Primary Examiner* — Colin W. Slifka
(74) *Attorney, Agent, or Firm* — Valet Patent Service Limited (57) ABSTRACT

A preparation method of a manganese iron phosphate precursor, a cathode sheet, and a lithium battery comprising: preparing the precursor based on a high-temperature calcination device. The high-temperature roasting furnace comprises a sprayer, a heater, and a particle size regulator. The method comprises: generating a manganese-containing solution from a manganese source and hydrochloric acid; generating an iron phosphate solution from an iron source, a phosphorus source, and hydrochloric acid; mixing the manganese-containing solution, iron phosphate solution, and dispersant to obtain a mixed solution; preheating the mixed solution; and transporting the mixed solution to the high-temperature roasting furnace; spraying and roasting the mixed solution in the high-temperature calcination furnace in the atmosphere of carrier gas, forming a powdered manganese iron phosphate precursor with at least two preset particle sizes; water washing and grinding, demagnetizing, and drying the manganese iron phosphate precursor to obtain the manganese iron phosphate precursor.

8 Claims, 6 Drawing Sheets

PREPARATION METHOD OF MANGANESE IRON PHOSPHATE PRECURSOR, CATHODE SHEET, AND LITHIUM BATTERY

TECHNICAL FIELD

The present application belongs to the technical field of lithium batteries, particularly relating to a preparation method of a manganese iron phosphate precursor, cathode sheet, and lithium battery.

BACKGROUND

Currently, the particle size D50 of primary particles of manganese iron phosphate precursor prepared based on high-temperature calcination devices is within a single particle size range. However, the lithium manganese iron phosphate cathode material prepared from a precursor of a single particle size range cannot meet the demands of the scenario, and there is still a gap from the theoretical compaction density of 3.6 g/cm$^3$ for lithium manganese iron phosphate electrode material.

The existing technology has issues with the high-temperature calcination device and preparation method for the manganese iron phosphate precursor not meeting the requirements.

SUMMARY

The present application embodiment provides a preparation method for a manganese iron phosphate precursor, a cathode sheet, and a lithium battery, aiming to address the issue of the high-temperature calcination device and preparation method for the manganese iron phosphate precursor not meeting the requirements to a certain extent.

In the first aspect, an embodiment of the present application provides a preparation method for a manganese iron phosphate precursor, the manganese iron phosphate precursor is prepared based on a high-temperature calcination device wherein the high-temperature calcination device comprises a first dissolution tank, a second dissolution tank, a mixing tank, a Venturi processor, a pump, a valve, and a vertical high-temperature roasting furnace, wherein the high-temperature roasting furnace comprises a sprayer located at the top, at least one set of heaters, and at least one particle size regulator, wherein the heaters are arranged in the middle and at the bottom of the outer surface of the high-temperature roasting furnace, wherein the particle size regulator is arranged inside the high-temperature roasting furnace corresponding to the position of the heaters, wherein the particle size regulator is configured to make the sprayed droplets move in reverse to adjust the suspension time of the droplets to control the particle size of the manganese iron phosphate precursor, wherein an outlet of the first dissolution tank and an outlet of the second dissolution tank are connected to a first inlet of the mixing tank, wherein an outlet at the bottom of the mixing tank is connected to a first inlet on a side wall of the Venturi processor, wherein an outlet at the bottom of the Venturi processor is connected to an inlet of the pump, wherein an outlet of the pump is connected to an inlet at the top of the high-temperature roasting furnace and a second inlet on the side wall of the Venturi processor, respectively, wherein a first outlet near the top of the high-temperature roasting furnace is connected to a third inlet at the top of the Venturi processor;

wherein the preparation method comprises:

S11. reacting the manganese source with hydrochloric acid in the first dissolution tank to generate a manganese-containing solution;

S12. reacting the iron source, phosphorus source, and hydrochloric acid in the second dissolution tank to generate an iron phosphate solution;

S2. uniformly mixing the manganese-containing solution, the iron phosphate solution, and dispersant in the mixing tank to obtain a mixed solution;

S3. transporting the mixed solution through the pump from the mixing tank to the Venturi processor for preheating;

S4. transporting the preheated and concentrated mixed solution through the pump to the inlet of the high-temperature calcination furnace;

S5. spraying and roasting the mixed solution in the high-temperature calcination furnace in the atmosphere of the carrier gas, forming a powdered manganese iron phosphate precursor with at least two preset particle sizes through the sprayer and the particle size regulator;

S6. water washing and grinding, demagnetizing, and drying the manganese iron phosphate precursor with at least two preset particle sizes to obtain the manganese iron phosphate precursor with at least two preset particle sizes.

The preparation method of a manganese iron phosphate precursor based on the high-temperature calcination device provided in the embodiment of the present application comprises a high-temperature calcination furnace with a sprayer, heater, and particle size regulator at the top. The heaters are arranged in the middle and at the bottom of the outer surface of the high-temperature calcination furnace, and the particle size regulator is arranged inside the furnace corresponding to the position of the heaters. The particle size regulator enables the reverse motion of the sprayed droplets to adjust their suspension time in the heating zone and control the particle size of the manganese iron phosphate precursor. This interaction between the downward spray effect and upward reverse motion in the heating zone forms more uniform and nearly spherical particles, resulting in a powdered manganese iron phosphate precursor with at least two preset particle sizes. When mixing large and small particle size precursors, the small particle size precursor better fills the gaps between the large particle size precursors, creating a graded packing density fill, thereby forming a high tap density lithium manganese iron phosphate cathode material.

In the second aspect, the embodiment of the present application provides a cathode sheet, which is made using the cathode material prepared from the manganese iron phosphate precursor as described in any item of the first aspect.

The cathode sheet of the present application, by using a manganese iron phosphate precursor with at least two preset particle sizes to prepare a high tap density lithium manganese iron phosphate cathode material, improves the electrochemical performance of the cathode sheet.

In the third aspect, the embodiment of the present application provides a lithium battery, characterized in that the lithium battery comprises the cathode sheet as described in the second aspect.

The lithium battery of the present application, using the cathode sheet made from lithium manganese iron phosphate obtained by the above preparation method, has improved conductivity and tap density of the lithium manganese iron phosphate cathode material, thereby providing the lithium battery with higher energy density and cycle performance.

BRIEF DESCRIPTION OF THE DRAWINGS

In order to more clearly illustrate the technical solutions in the embodiments of the present application, the accompanying drawings required for the description of the embodiments or the prior art will be briefly introduced below. It is evident that the accompanying drawings described below are merely some embodiments of the present application. For those skilled in the art, other drawings can be obtained based on these drawings without creative effort.

REFERENCE NUMBERS LIST

1. First Dissolution Tank; 2. Second Dissolution Tank; 3. Mixing Tank; 4. Venturi Processor; 5. Pump; 6. Valve; 7. High-temperature Calcination Furnace; 71. Sprayer; 72. Heater; 73. Particle Size Regulator; 731. Spiral Gas Pipe; 732. Intake Flow Rate Regulator; 733. Jet Hole; 734. Nozzle; 7341. Guide Sleeve; 7342. Nozzle Body; 7343. Unidirectional Jet Block.

DETAILED DESCRIPTION

In order to make the technical problems, technical solutions, and beneficial effects to be solved by the present application clearer, the following provides a further detailed description of the present application in conjunction with embodiments. It should be understood that the specific embodiments described herein are merely for explaining the present application and are not intended to limit it.

In the present application, the term "and/or" describes the associative relationship of associated objects, indicating that there can be three types of relationships. For example, A and/or B can indicate: the presence of A alone, the presence of both A and B, or the presence of B alone. Here, A and B can be singular or plural. The character "/" generally indicates an 'or' relationship between the associated objects before and after it.

In the present application, "at least one" means one or more, and "a plurality of" means two or more. "At least one of the following" or similar expressions refer to any combination of these items, including any combination of single or multiple items. For example, "at least one of a, b, or c", or "at least one of a, b, and c", can mean: a, b, c, a-b (i.e., a and b), a-c, b-c, or a-b-c, where a, b, and c can each be single or multiple.

The terms "first" and "second" are used solely for descriptive purposes to distinguish one object from another and should not be understood as indicating or implying relative importance or implicitly specifying the quantity of the technical features indicated. For example, without departing from the scope of the embodiments of the present application, the first XX may also be referred to as the second XX, and similarly, the second XX may also be referred to as the first XX. Thus, features limited by 'first' and 'second' may explicitly or implicitly include one or more of such features.

The terms used in the embodiments of the present application are solely for the purpose of describing specific embodiments and are not intended to limit the present application. The singular forms "a", "the", and "said" as used in the embodiments of the present application and the appended claims are also intended to include plural forms unless the context clearly indicates otherwise.

It should be understood that in various embodiments of the present application, the order of the above processes does not imply the sequence of execution. Some or all steps can be executed in parallel or sequentially. The execution order of each process should be determined by its function and inherent logic and should not impose any limitation on the implementation process of the embodiments of the present application.

The weights of the relevant components mentioned in the specification of the embodiments of the present application can not only refer to the specific content of each component but also represent the proportional relationship between the weights of the components. Therefore, as long as the content of the relevant components in the specification of the embodiments of the present application is proportionally enlarged or reduced, it falls within the scope disclosed in the specification of the embodiments of the present application. Specifically, the mass described in the specification of the present application can be in chemical industry well-known mass units such as g, mg, g, kg, etc.

Unless otherwise defined, all technical terms used below have the same meaning as commonly understood by those skilled in the art. The technical terms used herein are only for the purpose of describing specific embodiments and are not intended to limit the scope of the present invention.

Unless otherwise specified, various raw materials, reagents, instruments, and equipment used in the present application can be obtained through the market or prepared by existing methods.

Currently, the particle size D50 of the manganese iron phosphate precursor prepared based on the high-temperature calcination device is within one particle size range, but the lithium manganese iron phosphate cathode material prepared from a precursor of one particle size range cannot meet the requirements of the scenario, and there is still a gap from the theoretical compaction density of 3.6 g/cm$^3$ for lithium manganese iron phosphate electrode material.

Figure 1:
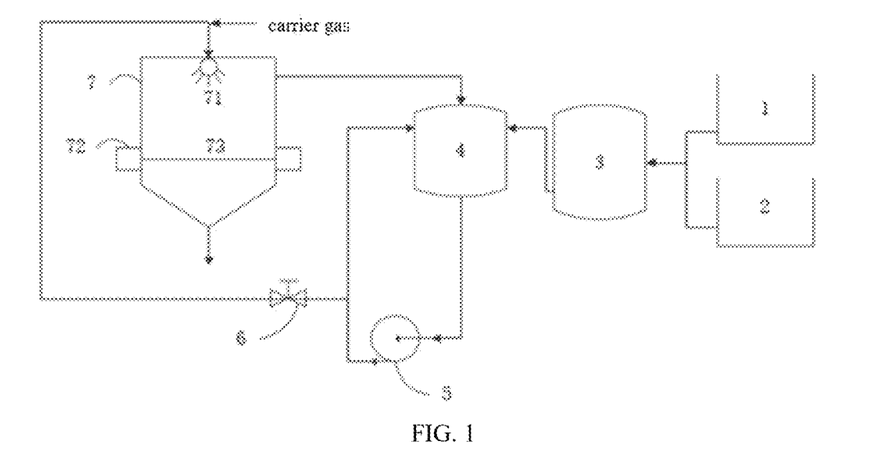
FIG. 1 is a schematic diagram of the structure of the high-temperature calcination device provided in an embodiment of the present application.

As shown in FIG. 1, the present application is based on a high-temperature calcination device for preparing a manganese iron phosphate precursor. The high-temperature calcination device comprises a first dissolution tank 1, a second dissolution tank 2, a mixing tank 3, a Venturi processor 4, a pump 5, a valve 6, and a vertical high-temperature roasting furnace 7. The high-temperature roasting furnace 7 comprises a sprayer 71 arranged at the top, at least one set of heaters 72, and at least one particle size regulator 73. The heaters 72 are arranged in the middle and at bottom of the outer surface of the high-temperature roasting furnace 7. The particle size regulator 73 is arranged inside the high-temperature roasting furnace 7, corresponding to the position of the heaters 72. The particle size regulator 73 causes the sprayed droplets to move in reverse to adjust the suspension time of the droplets, thereby controlling the particle size of the manganese iron phosphate precursor. The outlet of the first dissolution tank 1 and the outlet of the second dissolution tank 2 are connected to the first inlet of the mixing tank 3. The outlet at the bottom of the mixing tank 3 is connected to the first inlet on the side wall of the Venturi processor 4. The outlet at the bottom of the Venturi processor 4 is connected to the inlet of the pump 5. The outlet of the pump 5 is connected to the top inlet of the high-temperature roasting furnace 7 and the second inlet on the side wall of the Venturi processor 4. The first outlet near the top of the high-temperature roasting furnace 7 is connected to the third inlet at the top of the Venturi processor 4.

Figure 2:
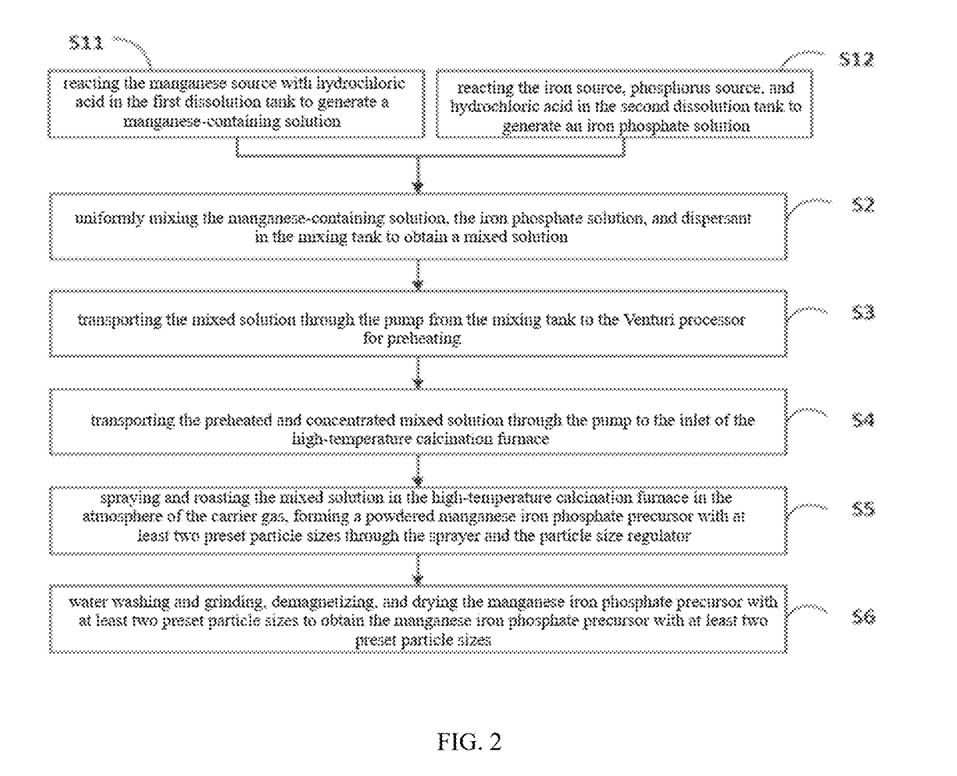
FIG. 2 is a flowchart of the preparation method of the manganese iron phosphate precursor provided in an embodiment of the present application.

As shown in FIG. 2, the first aspect of the embodiment of the present application provides a preparation method for a manganese iron phosphate precursor, comprising:
- S11. reacting the manganese source with hydrochloric acid in the first dissolution tank 1 to generate a manganese-containing solution;
- S12. reacting the iron source, phosphorus source, and hydrochloric acid in the second dissolution tank 2 to generate an iron phosphate solution;
- S2. uniformly mixing the manganese-containing solution, the iron phosphate solution, and dispersant in the mixing tank 3 to obtain a mixed solution;
- S3. transporting the mixed solution through pump 5 from the mixing tank 3 to the Venturi processor 4 for preheating;
- S4. transporting the preheated and concentrated mixed solution through pump 5 to the inlet of the high-temperature calcination furnace 7;
- S5. spraying and roasting the mixed solution in the high-temperature calcination furnace 7 in the atmosphere of carrier gas, forming a powdered manganese iron phosphate precursor with at least two preset particle sizes through the sprayer 71 and the particle size regulator 73;
- S6. water washing and grinding, demagnetizing, and drying the manganese iron phosphate precursor with at least two preset particle sizes to obtain the manganese iron phosphate precursor with at least two preset particle sizes.

In the preparation method of a manganese iron phosphate precursor provided by the embodiment of the present application based on a high-temperature calcination device, since the high-temperature calcination furnace 7 comprises a sprayer 71 at the top, heaters 72, and particle size regulators 73, the sprayer 71 at the top sprays the atomized droplets of the mixed solution downward. The heaters 72 are arranged in the middle and at bottom of the outer surface of the high-temperature calcination furnace 7, and the particle size regulator 73 is arranged inside the high-temperature calcination furnace 7 corresponding to the position of the heaters 72. The particle size regulator 73 causes the sprayed droplets to move in the opposite direction to the falling direction of the sprayed droplets, i.e., the particle size regulator 73 causes the sprayed droplets to move in the reverse direction towards the top of the high-temperature calcination furnace 7. As a result, under the interaction of the downward spray atomization and the reverse movement of the droplets at the top, on one hand, it promotes the formation of particles with more uniform particle size and shape closer to spherical, and more thorough particle formation. On the other hand, by controlling the time of reverse movement of the droplets to adjust the suspension time of the droplets in the heating zone, the particle size of the manganese iron phosphate precursor is controlled. Since the particle size regulator 3 is arranged inside the high-temperature calcination furnace 7 corresponding to the position of the heaters 72, the reverse movement of the atomized droplets in the heating area allows the heating and reverse movement to synergize. The longer the suspension time caused by the reverse movement, the longer the heating time, resulting in more reduction of the liquid component of the droplets and smaller particle size of the generated particles. Conversely, the shorter the suspension time caused by the reverse movement, the shorter the heating time, resulting in less reduction of the liquid component of the droplets and larger particle size of the generated particles. Thus, at least two types of powdered manganese iron phosphate precursors with preset particle sizes are formed. When the large particle size precursor and the small particle size precursor are mixed, the small particle size precursor can better fill the gaps between the large particle size precursor, thus forming a graded packing density fill of the large and small particle size precursors, resulting in a high tap density lithium manganese iron phosphate cathode material.

Figure 3:
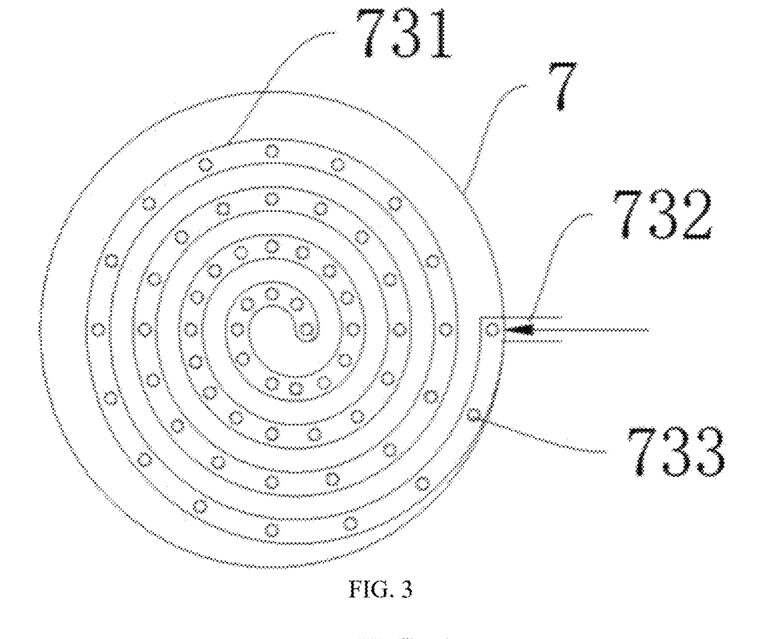
FIG. 3 is a top view schematic diagram showing the distribution of jet holes at preset intervals and angles in the spiral gas pipe of the particle size regulator provided in an embodiment of the present application.

In one embodiment, the sprayer 71 comprises an adjustable nozzle and a flow regulator (not shown in the figure). As shown in FIG. 3, the particle size regulator 73 comprises a spiral gas pipe 731 and an intake flow rate regulator 732. The spiral gas pipe 731 is provided with a plurality of jet holes 733 on the side close to the sprayer 71, and the gas inside the spiral gas pipe 731 is the carrier gas. Step S5 comprises: mixing the mixed solution with the carrier gas and setting the flow rate of the gas-liquid mixture through the flow regulator to a preset flow rate, then adjusting the adjustable nozzle to a preset aperture to spray in a preset atomization mode; performing evaporation process, drying process, and roasting process on the droplets of the atomized mixed solution in sequence from top to bottom, and adjusting the intake flow rate of the carrier gas in the spiral gas pipe 731 by the intake flow rate regulator 732 to form the powdered manganese iron phosphate precursor with at least two preset particle sizes. In this embodiment, the adjustable nozzle can adjust the nozzle aperture according to requirements, thereby adjusting the diameter of the ejected droplets and further adjusting the particle size of the manganese iron phosphate precursor. The adjustable nozzle can also adjust the flow rate of the gas-liquid mixture of the mixed solution and carrier gas through the flow regulator according to requirements, thereby adjusting the pressure of the ejected droplets and further adjusting the particle size of the manganese iron phosphate precursor. In this embodiment, the plurality of jet holes 733 arranged on the side of the sprayer 71 near the spiral gas pipe 731 will emit carrier gas according to the pressure of the intake flow rate regulator 732, causing the droplets to move upward in reverse due to the effect of reverse jetting. This adjusts the suspension time of the downward-sprayed droplets during evaporation process, drying process, and roasting process, thereby adjusting the particle size of the manganese iron phosphate precursor. It can be understood that the shorter the suspension time of the atomized droplets sprayed by the sprayer 71 during evaporation process, drying process, and roasting process, the less the solvent evaporation and pyrolysis of the atomized droplets, reducing the drying and curing effect of the atomized droplets, resulting in a relatively larger particle size of the manganese iron phosphate precursor. The longer the suspension time of the atomized droplets sprayed by the sprayer 71 during the evaporation process, drying process, and roasting process, the more the solvent in the atomized droplets evaporates and pyrolyzes, promoting the drying and solidification of the atomized droplets, resulting in a smaller particle size of the manganese iron phosphate precursor.

Figure 4:
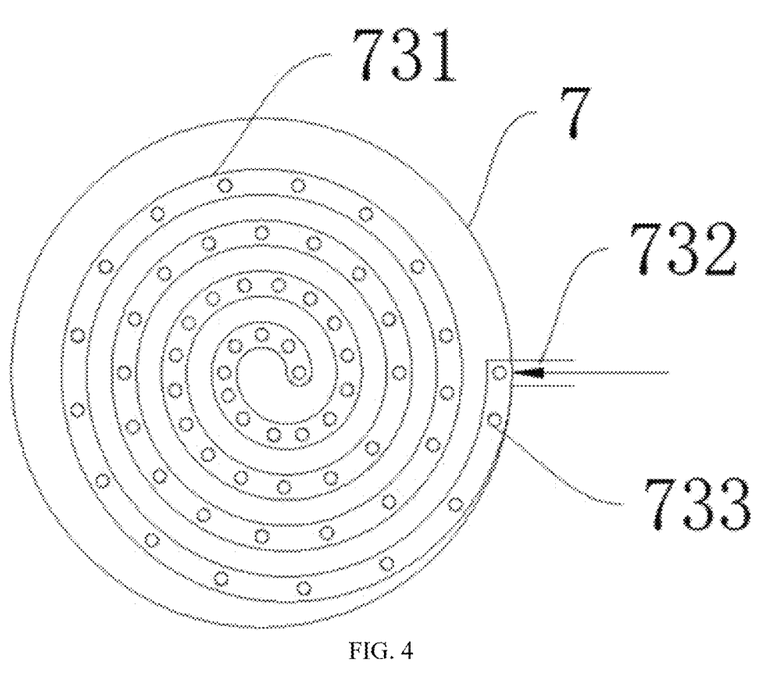
FIG. 4 is a schematic diagram of the structure showing the staggered arrangement of jet holes in adjacent turns of the spiral gas pipe provided in an embodiment of the present application.

In some embodiments, compared to the prior art where spraying in only one direction causes droplets to be affected by gravity during descent, the particles of the manganese iron phosphate precursor cannot form a nearly spherical shape, and the range for controlling the suspension time of the droplets is relatively small; The plurality of jet holes 733 are arranged on the side of the spiral gas pipe 731 near the sprayer 71, with the jet holes of the spiral gas pipe 731 distributed at preset angles in a clockwise or counterclockwise direction, as shown in FIG. 3, or with the jet holes of adjacent loops of the spiral gas pipe 731 arranged in a staggered manner, as shown in FIG. 4. This allows the jet of the spiral gas pipe 731 to form a uniformly covered reverse dynamics in the heating zone of the high-temperature calcination furnace 7, enabling more spray droplets to perform uniform reverse suspension motion in the heating zone, thereby forming particles of the manganese iron phosphate precursor with more uniform particle size and shape closer to spherical. It also allows control over a larger range of suspension time, thus forming particles of the manganese iron phosphate precursor within a preset particle size range.

Figure 5:
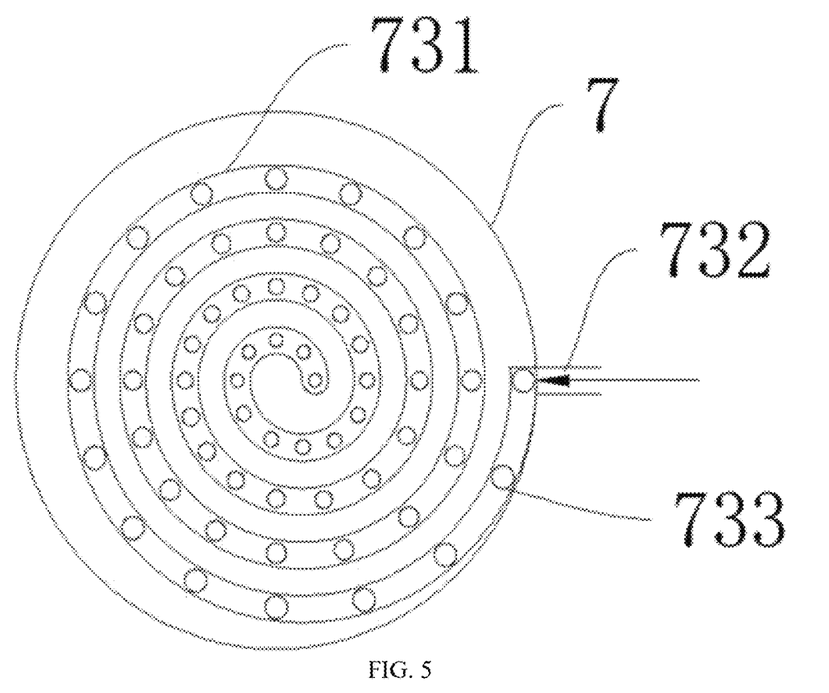
FIG. 5 is a schematic diagram of the structure showing the distribution of jet holes at preset intervals and angles, with the diameter of the jet holes in each semicircle increasing sequentially, provided in an embodiment of the present application.

In one embodiment, due to the identical diameter of each jet hole 733, the distribution of the jet holes 733 on the spiral gas pipe 731 becomes relatively sparse towards the outside, resulting in the droplets in local areas experiencing uneven reverse dynamics. As shown in FIG. 5, the particle size regulator 73 comprises a spiral gas pipe 731 and an intake flow rate regulator 732. The spiral gas pipe 731 is provided with a plurality of jet holes 733 on the side near the sprayer 71, extending from the inside to the outside along the spiral gas pipe 731. The diameter of the jet holes in each semicircle of the spiral gas pipe 731 increases sequentially. Due to the smaller diameter in the dense area of the inner circle, the diameter is then gradually increased. The jet holes in the outer circle have a larger diameter, resulting in a larger range of jet influence. This compensates for the uneven reverse dynamics received by the droplets in local areas, allowing for a uniformly covered reverse dynamics in the heating zone of the high-temperature calcination furnace. This enables more spray droplets to undergo uniform reverse suspension motion in the heating zone, forming particles of the manganese iron phosphate precursor with more uniform particle size and a shape closer to spherical. It also allows for control over a larger range of suspension time, thereby forming particles of the manganese iron phosphate precursor within a preset particle size range.

Figure 6:
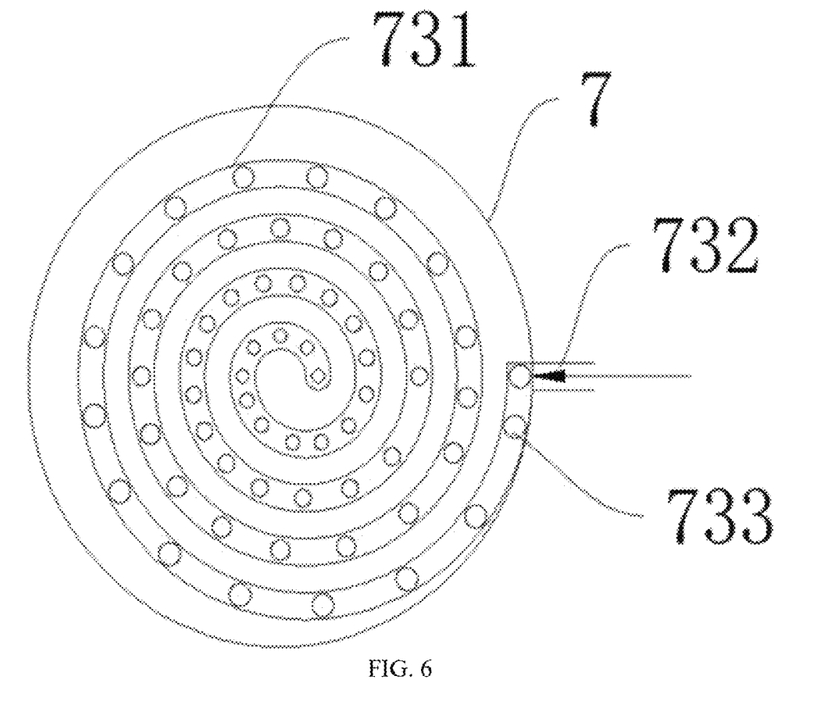
FIG. 6 is a schematic diagram of the structure in which the jet holes of adjacent turns of the spiral gas pipe provided in an embodiment of the present application are staggered, and the diameter of the jet holes in each semicircle increases sequentially.

In some embodiments, the plurality of jet holes 733 are arranged on one side of the sprayer 71 near the spiral gas pipe 731. The jet holes of the spiral gas pipe 731 are distributed at preset angles in a clockwise or counterclockwise direction and extend from the inside to the outside along the spiral gas pipe 731. The diameter of the jet holes in each semicircle of the spiral gas pipe 731 increases sequentially, as shown in FIG. 5. Alternatively, the jet holes of adjacent loops of the spiral gas pipe 731 are staggered and extend from the inside to the outside along the spiral gas pipe 731, as shown in FIG. 6. The diameter of the jet holes in each semicircle of the spiral gas pipe 731 increases sequentially. It can further enable the formation of more uniformly covered reverse dynamics in the heating zone of the high-temperature calcination furnace 7, allowing more spray droplets to perform uniform reverse suspension motion in the heating zone. This results in manganese iron phosphate precursor particles with more uniform particle size and shapes closer to spherical and allows control over a larger range of suspension times, thereby forming manganese iron phosphate precursor particles within a preset particle size range.

Figure 7:
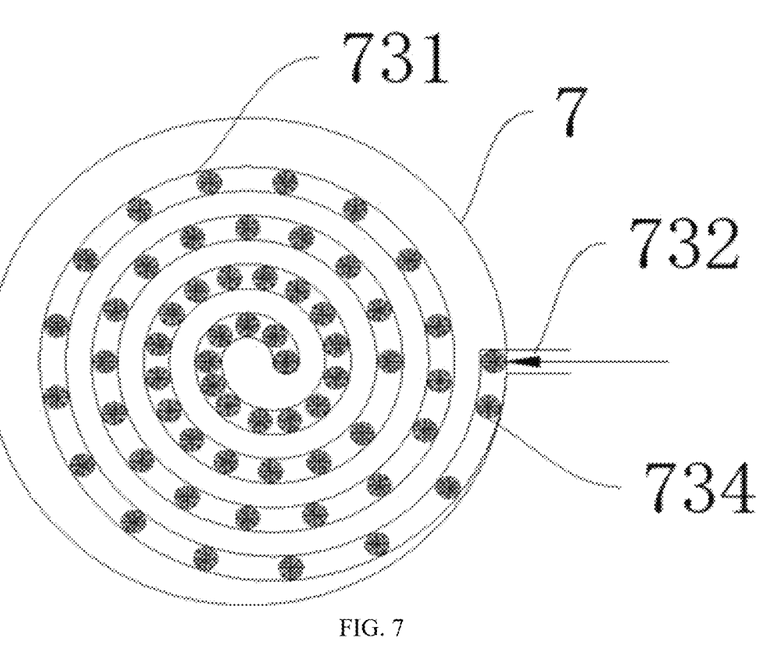
FIG. 7 is a schematic diagram of the structure in which a nozzle is set in the jet hole of the spiral gas pipe provided in an embodiment of the present application.
Figure 8:
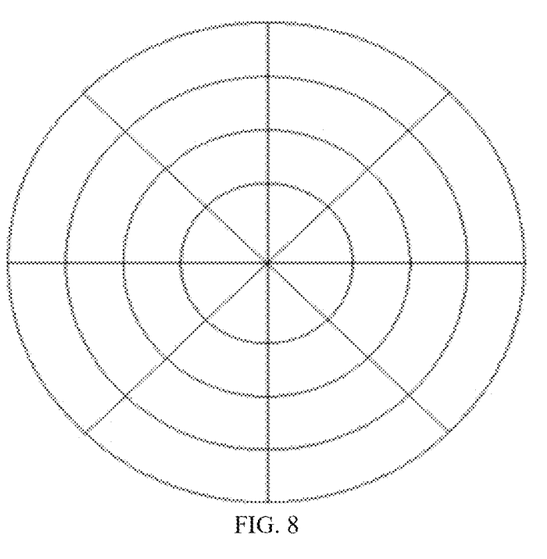
FIG. 8 is a top view schematic diagram of the hollowed-out nozzle body provided in an embodiment of the present application.
Figure 9:
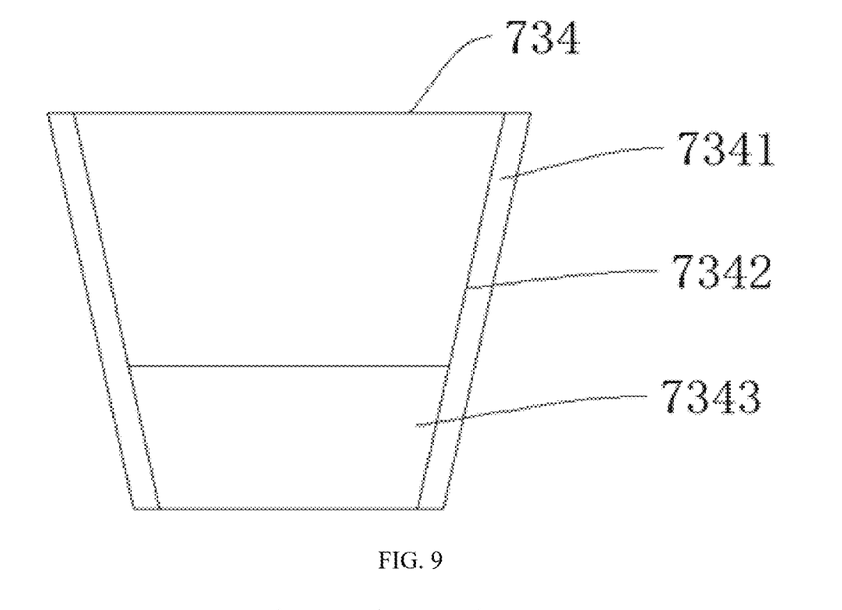
FIG. 9 is a cross-sectional schematic diagram of the structure in which the nozzle in the jet hole of the spiral gas pipe provided in an embodiment of the present application does not perform jetting.
Figure 10:
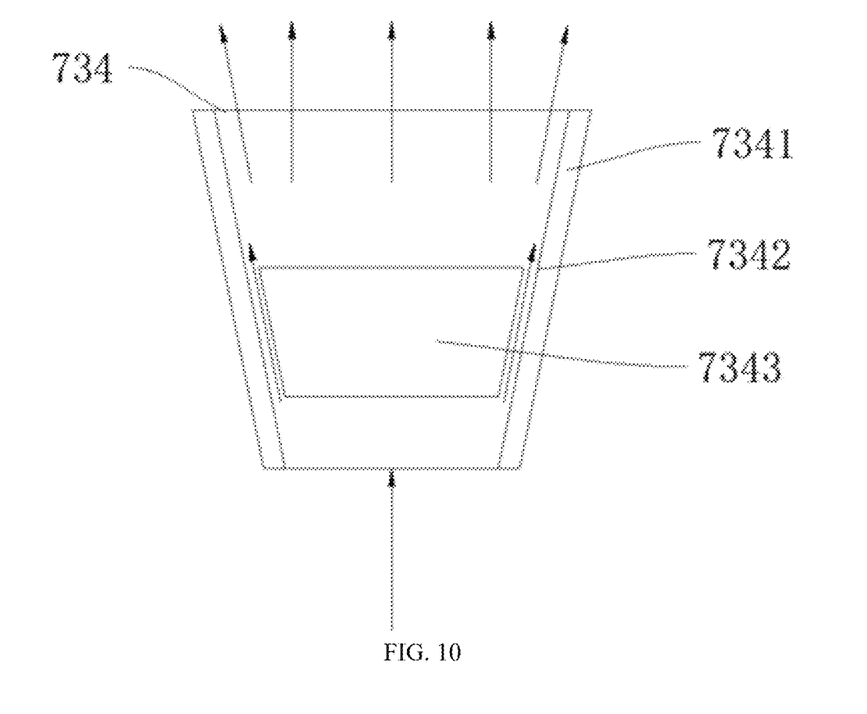
FIG. 10 is a schematic cross-sectional view of the nozzle jetting in the jet hole of the spiral gas pipe provided in an embodiment of the present application.
Figure 11:
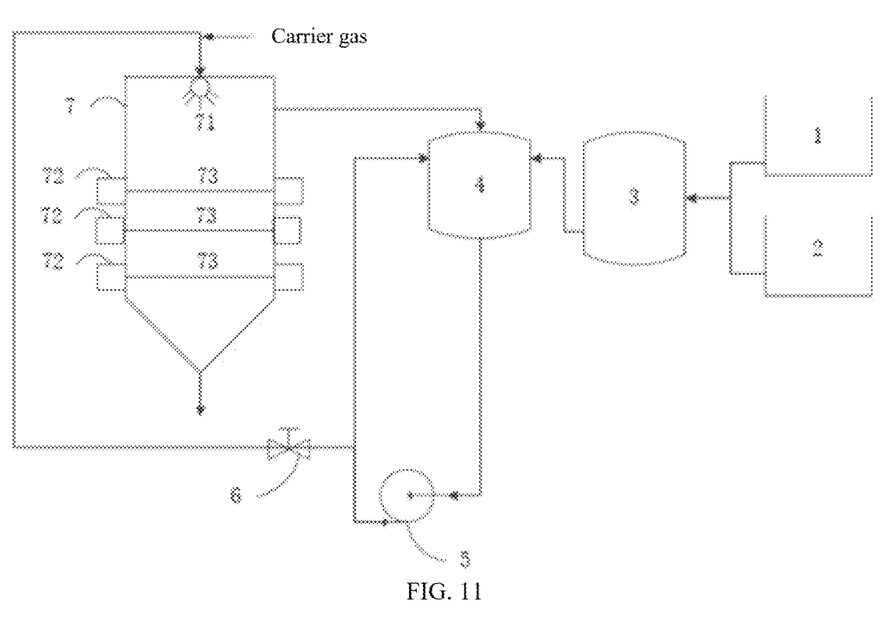
FIG. 11 is a schematic structural view of a high-temperature calcination device provided in another embodiment of the present application, which comprises three particle size regulators.

In one embodiment, due to the need to adjust the suspension time of the droplets after spraying, when the jet hole does not emit gas outward, some manganese iron phosphate precursor particles may fall in, causing partial blockage of the jet hole. Alternatively, the gas emitted from the jet hole can only generate corresponding reverse dynamics in the area near the diameter of the jet hole, reducing the range of reverse dynamics generated by the jet hole's outward emission. As shown in FIG. 7, in any jet hole 733, a nozzle 734 is provided. The nozzle 734 comprises a guide sleeve 7341, a nozzle body 7342, and a unidirectional jet block 7343. The nozzle body 7342 is an inverted frustum with an open bottom, with a gradually increasing diameter from the spiral gas pipe 731 towards the sprayer 71. The guide sleeve 7341 is an elastic sleeve set outside the nozzle body 7342. The diameter of the bottom of the nozzle body 7342, on the side away from the sprayer 71, is smaller than the diameter of the corresponding jet hole 733. The diameter of the top of the nozzle body 7342, on the side close to the sprayer 71, is larger than the diameter of the corresponding jet hole 733. The top of the nozzle body 7342 is a hollow surface, as shown in FIG. 8; The unidirectional jet block 7343 corresponds to the inverted frustum shape of the nozzle body 7342. The ratio of the height of the nozzle body 7342 to the height of the unidirectional jet block 7343 is (3~1.2):1. The height of the nozzle body 7342 is less than the diameter of the spiral gas pipe 731 and greater than the thickness of the spiral gas pipe 731. The guide sleeve 7341 is used to interference-fix the nozzle 734 in the jet hole 733, while preventing the carrier gas from jetting out through the gap between the guide sleeve 7341 and the jet hole 733. As shown in FIG. 9, when the spiral gas pipe 731 is not jetting, the unidirectional jet block 7343 slides into the bottom along the inverted frustum shape of the nozzle body 7342 under the action of gravity, thereby blocking the jet hole 733 and preventing the blockage of the jet hole. As shown in FIG. 10, when the spiral gas pipe 731 jets through the jet hole 733, the carrier gas enters from the opening at the bottom of the nozzle body 7342, blowing the unidirectional jet block 7343 towards the top of the nozzle body 7342. It then jets out through the gap between the unidirectional jet block 7343 and the nozzle body 7342, providing reverse dynamics opposite to the droplet's descending direction, and expands the range of reverse dynamics of the jet through an inverted frustum shape. It is understandably possible that the diameter of the top of the nozzle body 7342, near the side of the sprayer 71, can gradually increase along the spiral gas pipe 731 from the inside to the outside, facilitating the formation of a more uniform reverse dynamics coverage area.

In another embodiment, as shown in FIG. 11, the evaporation zone corresponding to the evaporation process, the drying zone corresponding to the drying process, and the roasting zone corresponding to the roasting process are each equipped with at least one set of heaters 72 and at least one particle size regulator 73. The heaters 72 are respectively arranged on the outer surface of the high-temperature calcination furnace 7 corresponding to the evaporation zone, drying zone, and roasting zone. Each of the evaporation zone, drying zone, and roasting zone is equipped with at least one particle size regulator 73, where the heater 72 can be a microwave heater, a gas heater, or a combination of a microwave heater and a gas heater; This allows for the suspension time of atomized droplets to be controlled separately in the evaporation zone, drying zone, and roasting zone, further enhancing the ability to control the suspension time of atomized droplets in the high-temperature calcination furnace 7. Additionally, the atomized droplets can be fully processed in each zone to form manganese iron phosphate precursors with various required particle sizes. For example, the evaporation zone is a microwave heater, the drying zone is a microwave heater, and the roasting zone is a gas heater; or the evaporation zone, drying zone, and roasting zone are all microwave heaters; or the evaporation zone, drying zone, and roasting zone are all gas heaters.

In some embodiments, the mixed gas of gases generated from evaporation process, drying process, and roasting process, along with the carrier gas, enters the third inlet of the Venturi processor 4 through the first outlet near the top of the high-temperature calcination furnace 7. Through the self-circulation of the Venturi processor 4 and pump 5, the mixed gas preheats and concentrates the mixed solution, evaporating 25 wt %~35 wt % of the moisture in the mixed solution. In this embodiment, the manganese-containing solution, iron phosphate solution, and dispersant are uniformly mixed in the mixing tank 3 to obtain a mixed solution, which is then transported to the Venturi processor 4 for preheating concentration. This process can reduce the viscosity of the mixed solution, decrease the clogging of the sprayer 71, and concentrate 25 wt %~35 wt % of the moisture in the mixed solution (e.g., 30 wt % of the moisture), thereby reducing the heating energy consumption of the high-temperature calcination furnace 7 and lowering the cost of preparing the manganese iron phosphate precursor.

In some embodiments, the preset particle size D50 is less than or equal to 800 nm. The preset particle size comprises the first preset particle size and the second preset particle size, where the first preset particle size is greater than the second preset particle size. The intake flow rate of the carrier gas in the spiral gas pipe 731 comprises the first intake flow rate and the second intake flow rate, with the first intake flow rate being less than the second intake flow rate; Wherein, the adjusting the intake flow rate of the carrier gas in the spiral gas pipe 731 by the intake flow rate regulator 732 to form the powdered manganese iron phosphate precursor with at least two preset particle sizes, comprising: adjusting the intake flow rate of the carrier gas in the spiral gas pipe 731 to the first intake flow rate by the intake flow rate regulator 732, forming a powdered manganese iron phosphate precursor with the first preset particle size; adjusting the intake flow rate of the carrier gas in the spiral gas pipe 731 to the secondary intake flow rate by the intake flow rate regulator 732, forming a powdered manganese iron phosphate precursor with a secondary preset particle size. In this embodiment, according to the particle size requirements of the manganese iron phosphate precursor, the carrier gas in the spiral gas pipe 731 is adjusted to a smaller first intake flow rate, resulting in less obstruction to the descent of atomized droplets sprayed by the sprayer 71. The suspension time of the atomized droplets during evaporation process, drying process, and roasting process is shorter, leading to less solvent evaporation and pyrolysis of the atomized droplets, thereby reducing the drying and curing effect of the atomized droplets. As a result, the particle size of the manganese iron phosphate precursor will be relatively large. Adjusting the carrier gas in the spiral gas pipe 731 to a larger secondary intake flow rate significantly hinders the descent of the atomized droplets sprayed by the sprayer 71. The suspension time of the atomized droplets during evaporation process, drying process, and roasting process is relatively long, resulting in more solvent evaporation and pyrolysis of the atomized droplets, which promotes the drying and solidification of the atomized droplets. Consequently, the particle size of the manganese iron phosphate precursor will be relatively small.

In some embodiments, the first preset particle size is 400 nm$<$D501$\leq$800 nm; and/or the secondary preset particle size is 20 nm$\leq$D502$\leq$200 nm; the first intake flow rate is 5 NM3/h$\leq$Q1$\leq$30 NM3/h, and the second intake flow rate is 40 NM3/h$\leq$Q2$\leq$120 NM3/h. In this embodiment, a smaller first intake flow rate corresponds to a larger first preset particle size, and a larger second intake flow rate corresponds to a smaller second preset particle size, thereby achieving control of the particle size of the manganese iron phosphate precursor by adjusting the intake flow rate of the spiral gas pipe 731.

In other embodiments, the preset particle size also comprises a third preset particle size, which is greater than the second preset particle size and less than the first preset particle size. The intake flow rate of the carrier gas in the spiral gas pipe 731 also comprises a third intake flow rate, which is less than the second intake flow rate and greater than the first intake flow rate. The third preset particle size is 300 nm$<D50_3\leq$600 nm, and the third intake flow rate is 30 $NM^3/h<Q_3<10\ NM^3/h$. In this embodiment, the third preset particle size is between the second preset particle size and the first preset particle size, and the third intake flow rate is between the first intake flow rate and the second intake flow rate. The third intake flow rate corresponds to the formation of a third preset particle size between larger and smaller particles, thereby achieving control of multiple particle sizes of the manganese iron phosphate precursor by adjusting the intake flow rate of the spiral gas pipe 731.

It can be understood that the suspension time of the atomized droplets in the evaporation zone, drying zone, and roasting zone can be controlled by adjusting the ventilation time of the carrier gas in the spiral gas pipe 731, thereby forming multiple particle sizes of the manganese iron phosphate precursor. Alternatively, the suspension time of the atomized droplets in the evaporation zone, drying zone, and roasting zone can be controlled by simultaneously adjusting the ventilation time and intake flow rate of the carrier gas in the spiral gas pipe 731, thereby forming multiple particle sizes of the manganese iron phosphate precursor.

In some embodiments, the preset atomization method is two-fluid internal mixing gas atomization formed by carrier gas and mixed solution, where the ratio of the flow rate of the carrier gas to the flow rate of the mixed solution is (50~400):1; and/or the temperature for preheating concentration is 65° C.—95° C. In this embodiment, the flow rate of the carrier gas is much greater than the flow rate of the mixed solution, facilitating the formation of atomized droplets by dispersing the mixed solution through the high flow rate of the carrier gas. For example, the flow rate of the carrier gas is 30 NM³/h~90 NM³/h, and the flow rate of the mixed solution is 0.225 NM³/h~0.6 NM³/h.

In some embodiments, the temperature for the roasting process is 500° C.~1000° C.; and/or the time for the evaporation process, drying process, and roasting process is 2 min~5 min. Wherein, the temperature for the evaporation process is 100~200° C., and the temperature for the drying process is 300~450° C. In this embodiment, the evaporation process involves evaporating the solvent from the atomized droplets, thereby reducing the particle size of the atomized droplets and facilitating faster pyrolysis after the solvent is removed; The drying process involves removing the solvent and moisture involved in the evaporated droplets, further reducing the particle size of the atomized droplets, and facilitating faster pyrolysis after the solvent is removed; The roasting process involves heating to cause the pyrolysis reaction of the atomized droplets of manganese solution, iron phosphate solution, and dispersant, releasing reaction gases and retaining solid spherical substances, forming a powdered manganese iron phosphate precursor.

In some embodiments, the mass ratio of manganese element to hydrochloric acid in the manganese iron phosphate precursor is 1:(5~20); And/or, the mass ratio of iron element to hydrochloric acid in the manganese iron phosphate precursor is 1:(5~20); And/or, the molar ratio of the sum of manganese element and iron element to phosphorus element in the manganese iron phosphate precursor is 1:(0.9~1.1); and/or, hydrochloric acid can also be nitric acid or sulfuric acid. In this embodiment, the ratios of manganese element to hydrochloric acid, iron element to hydrochloric acid, and manganese iron element to phosphorus element are defined to control the elemental ratio of manganese iron in the manganese iron phosphate precursor, thereby improving the electrochemical performance of the cathode material prepared using the manganese iron phosphate precursor.

In some embodiments, the amount of dispersant added is 0.5% to 2.0% of the total mass of the mixed solution of manganese-containing solution, iron phosphate solution, and dispersant. The mass percentage of the dispersant in this embodiment can effectively disperse the precursor without increasing costs, thereby forming a precursor with morphology, crystal form, and particle size that all meet the requirements. For example, the dispersant is polyethylene glycol, which has good water solubility (can effectively disperse particles in aqueous systems), low toxicity, biocompatibility, and surface activity (having both hydrophobic and hydrophilic parts, can reduce interfacial tension and stabilize suspensions).

In some embodiments, the phosphorus source comprises at least one of ammonium phosphate, ammonium dihydrogen phosphate, diammonium hydrogen phosphate, phosphoric acid, iron phosphate, lithium phosphate, and lithium dihydrogen phosphate; and/or the iron source comprises one or a combination of several of metal iron powder, metal iron sheet, metal iron ingot, red iron oxide, magnetite, ferric hydroxide, ferric sulfate, ferric nitrate, iron phosphate, ferrous oxalate, ferric oxide, ferric chloride, ferrous chloride, and their hydrates; and/or the manganese source contains one or a combination of several of metal manganese powder, metal manganese sheet, metal manganese ingot, manganese monoxide, manganese dioxide, manganese tetraoxide, manganese sulfate, manganese nitrate, manganese phosphate, manganese oxalate, manganese chloride, and their hydrates; and/or the carrier gas comprises one or more combinations of nitrogen, argon, helium, neon, krypton, and xenon. In this embodiment, the sources of phosphorus, iron, manganese, carrier gas, and dispersant are specified to facilitate reducing the cost of preparing the manganese iron phosphate precursor and to conveniently select the corresponding types according to different needs.

The technical solution of the present application is illustrated below through specific embodiments and comparative examples.

Embodiment 1

The high-temperature calcination device comprises a first dissolution tank 1, a second dissolution tank 2, a mixing tank 3, a Venturi processor 4, a pump 5, a valve 6, and a vertical high-temperature roasting furnace 7. The high-temperature roasting furnace 7 comprises a sprayer 71 located at the top, 6 sets of heaters 72, and 2 particle size regulators 73. Among them, the evaporation zone is equipped with 3 sets of microwave heaters, the drying zone is equipped with 2 sets of microwave heaters, and the roasting zone is equipped with 1 set of gas heaters; or the evaporation zone and drying zone are each equipped with 1 particle size regulator 73.

S11. by mass, reacting 1 part metal manganese sheet with 5 parts hydrochloric acid in the first dissolution tank 1 to generate a manganese-containing solution.

S12. reacting 1 part metal iron sheet, 1 part ammonium phosphate, and 5 parts hydrochloric acid in the second dissolution tank 2 to generate an iron phosphate solution.

S2. uniformly mixing the manganese-containing solution, iron phosphate solution, and a dispersant accounting for 1.0% of the total mass of the mixed solution in the mixing tank 3 to obtain a mixed solution.

S3. transporting the mixed solution through the pump 5 from mixing tank 3 to the Venturi processor 4 for preheating, with the preheating temperature being 80° C.

S4. After preheating and concentrating the mixed solution to 30 wt %, transportes it to the inlet of the high-temperature calcination furnace 7 through pump 5.

S5. spraying and roasting the mixed solution in the high-temperature calcination furnace 7 in a nitrogen atmosphere, forming a powdered manganese iron phosphate precursor with two preset particle sizes through sprayer 71 and particle size regulator 73;

wherein, the ratio of the air flow rate to the flow rate of the mixed solution is 200:1, the first preset particle size is 600 nm<$D50_1$≤700 nm. The second preset particle size is 200 nm≤$D50_2$≤300 nm, the first intake flow rate is 25 NM³/h, the secondary intake flow rate is 35 NM³/h, the temperature for evaporation process is 150° C., the temperature for drying process is 350° C., and the temperature for roasting process is 800° C. The total suspension time for the evaporation process, drying process, and roasting process corresponding to the first preset particle size is 3.5 min, and the total suspension time for the evaporation process, drying process, and roasting process corresponding to the second preset particle size is 4.0 min;

S6. water washing and grinding, demagnetizing, and drying the manganese iron phosphate precursor with two preset particle sizes to obtain the manganese iron phosphate precursors with two preset particle sizes.

Embodiment 2: The difference from Embodiment 1 is that one particle size regulator 73 is arranged in each of the evaporation zone, drying zone, and roasting zone, and the parameters of spray roasting in step S5 are adjusted to form manganese iron phosphate precursors with two preset particle sizes.

Among them, the ratio of the air flow rate to the flow rate of the mixed solution is 300:1, the first preset particle size is 700 nm<$D50_1$≤800 nm; The second preset particle size is 100 nm≤$D50_2$≤200 nm, the first intake flow rate is 8 $NM^3/h$, the second intake flow rate is 60 $NM^3/h$, the temperature of the evaporation process is 150° C., the temperature of the drying process is 350° C., and the temperature of the roasting process is 800° C.; The total suspension time for the evaporation process, drying process, and roasting process corresponding to the first preset particle size is 3.0 min, and the total suspension time for the evaporation process, drying process, and roasting process corresponding to the second preset particle size is 5.0 min.

Embodiment 3: The difference from Embodiment 1 is that one particle size regulator 73 is arranged in each of the evaporation zone, drying zone, and roasting zone, and the parameters of spray roasting in step S5 are adjusted to form manganese iron phosphate precursors with three preset particle sizes.

Among them, the ratio of the air flow rate to the flow rate of the mixed solution is 400:1, the first preset particle size is 600 nm<$D50_1$≤700 nm; The second preset particle size is 100 nm≤$D50_2$≤200 nm, the third preset particle size is 400 nm≤$D50_3$≤500 nm, the first intake flow rate is 25 $NM^3/h$, the second intake flow rate is 60 $NM^3/h$, the third intake flow rate is 20 $NM^3/h$, the temperature of the evaporation process is 150° C., the temperature of the drying process is 350° C., and the temperature of the roasting process is 800° C.; The total suspension time for the evaporation process, drying process, and roasting process corresponding to the first preset particle size is 3.5 min, the total suspension time for the evaporation process, drying process, and roasting process corresponding to the second preset particle size is 5.0 min, and the total suspension time for the evaporation process, drying process, and roasting process corresponding to the third preset particle size is 4.5 min.

Comparative example: The difference from Embodiment 1 is that no particle size regulator 73 is arranged, only forming the manganese iron phosphate precursor and lithium manganese iron phosphate cathode material with the secondary preset particle size.

The manganese iron phosphate precursors prepared in Embodiment 1, Embodiment 2, and the comparative example are made into lithium manganese iron phosphate cathode materials and then assembled into coin cells to test the tap density. After testing, the tap densities of Embodiment 1, Embodiment 2, and the comparative example are 2.540 $g/cm^3$, 2.650 $g/cm^3$, and 2.480 $g/cm^3$, respectively.

It should be understood that the order of the steps in the above embodiments does not imply the sequence of execution. The execution order of each process should be determined by its function and intrinsic logic and should not impose any limitation on the implementation process of the embodiments of the present application. In the above embodiments, the descriptions of each embodiment have their own emphasis. Parts not detailed or recorded in a particular embodiment can be referred to in the relevant descriptions of other embodiments.

The above-described embodiments are only intended to illustrate the technical solutions of the present application and not to limit them. Although the present application has been described in detail with reference to the aforementioned embodiments, those skilled in the art should understand that they can still modify the technical solutions described in the aforementioned embodiments or make equivalent replacements of some technical features. These modifications or replacements do not deviate the essence of the corresponding technical solutions from the spirit and scope of the technical solutions of the embodiments of the present application and should be included within the protection scope of the present application.

What is claimed is:

1. A preparation method of a manganese iron phosphate precursor, characterized in that the manganese iron phosphate precursor is prepared based on a high-temperature calcination device, wherein the high-temperature calcination device comprises a first dissolution tank, a second dissolution tank, a mixing tank, a Venturi processor, a pump, a valve, and a vertical high-temperature roasting furnace, wherein the high-temperature roasting furnace comprises a sprayer located at the top, at least one set of heaters, and at least one particle size regulator, wherein the heaters are arranged in the middle and at the bottom of the outer surface of the high-temperature roasting furnace, wherein the particle size regulator is arranged inside the high-temperature roasting furnace corresponding to the position of the heaters, wherein the particle size regulator is configured to make the sprayed droplets move in reverse to adjust the suspension time of the droplets to control the particle size of the manganese iron phosphate precursor, wherein an outlet of the first dissolution tank and an outlet of the second dissolution tank are connected to a first inlet of the mixing tank, wherein an outlet at the bottom of the mixing tank is connected to a first inlet on a side wall of the Venturi processor, wherein an outlet at the bottom of the Venturi processor is connected to an inlet of the pump, wherein an outlet of the pump is connected to an inlet at the top of the high-temperature roasting furnace and a second inlet on the side wall of the Venturi processor, respectively, wherein a first outlet near the top of the high-temperature roasting furnace is connected to a third inlet at the top of the Venturi processor;

wherein any of the particle size regulators comprises a spiral gas pipe, wherein a plurality of jet holes are arranged on one side of the spiral gas pipe close to the sprayer, and the diameters of the jet holes in each semicircle of the spiral gas pipe increase successively from the inside to the outside along the spiral gas pipe, and the jet holes of the spiral gas pipe are distributed at preset angles in a clockwise or counterclockwise direction, or the jet holes of adjacent loops of the spiral gas pipe are arranged in a staggered manner;

wherein the preparation method comprises:

S11. reacting the manganese source with hydrochloric acid in the first dissolution tank to generate a manganese-containing solution;

S12. reacting the iron source, phosphorus source, and hydrochloric acid in the second dissolution tank to generate an iron phosphate solution;

S2. uniformly mixing the manganese-containing solution, the iron phosphate solution, and dispersant in the mixing tank to obtain a mixed solution;

S3. transporting the mixed solution through the pump from the mixing tank to the Venturi processor for preheating;

S4. transporting the preheated and concentrated mixed solution through the pump to the inlet of the high-temperature calcination furnace;

S5. spraying and roasting the mixed solution in the high-temperature calcination furnace in the atmosphere of the carrier gas, forming a powdered manganese iron phosphate precursor with at least two preset particle sizes through the sprayer and the particle size regulator;

S6. water washing and grinding, demagnetizing, and drying the manganese iron phosphate precursor with at least two preset particle sizes to obtain the manganese iron phosphate precursor with at least two preset particle sizes.

2. The preparation method according to claim 1, characterized in that the sprayer comprises an adjustable nozzle and a flow regulator, any of the particle size regulators comprises an intake flow rate regulator, and the gas inside the spiral gas pipe is the carrier gas;

wherein the step S5 comprises:

mixing the mixed solution with the carrier gas and setting the flow rate of a gas-liquid mixture by the flow regulator to a preset flow rate, then adjusting the adjustable nozzle to a preset aperture to spray in a preset atomization mode;

performing evaporation process, drying process, and roasting process on the droplets of the atomized mixed solution in sequence from top to bottom, and adjusting the intake flow rate of the carrier gas in the spiral gas pipe by the intake flow rate regulator to form the powdered manganese iron phosphate precursor with at least two preset particle sizes;

wherein making the mixed gas of the gas generated by the evaporation process, the drying process, and the roasting process and the carrier gas to enter the third inlet of the Venturi processor through the first outlet near the top of the high-temperature calcination furnace, wherein preheating and concentrating the mixed solution through and the self-circulation of the pump and the Venturi processor and mixing gas, wherein the preheating and concentrating is to evaporate 25 wt %-35 wt % of the moisture in the mixed solution.

3. The preparation method according to claim 2, characterized in that the preset particle size is less than or equal to 800 nm, wherein the preset particle size comprises a first preset particle size and a second preset particle size, wherein the first preset particle size is greater than the second preset particle size, wherein the intake flow rate of the carrier gas in the spiral gas pipe comprises a first intake flow rate and a second intake flow rate, wherein the first intake flow rate is less than the second intake flow rate;

wherein the adjusting the intake flow rate of the carrier gas in the spiral gas pipe by the intake flow rate regulator to form the powdered manganese iron phosphate precursor with at least two preset particle sizes, comprising:

adjusting the intake flow rate of the carrier gas in the spiral gas pipe to the first intake flow rate by the intake flow rate regulator, forming a powdered manganese iron phosphate precursor with the first preset particle size;

adjusting the intake flow rate of the carrier gas in the spiral gas pipe to the second intake flow rate by the intake flow rate regulator, forming a powdered manganese iron phosphate precursor with the second preset particle size.

4. The preparation method according to claim 3, characterized in that the first preset particle size is 400 nm<$D50_1$≤800 nm;

and/or, the second preset particle size is 20 nm≤$D50_2$≤200 nm.

5. The preparation method according to claim 2, characterized in that the preset atomization mode is two-fluid internal mixing gas atomization formed by the carrier gas and the mixed solution, wherein the ratio of the flow rate of the carrier gas to the flow rate of the mixed solution is (50~400):1;

and/or the temperature of the preheating and concentrating is 65° C.~95° C.

6. The preparation method according to claim 2, characterized in that the temperature of the roasting process is 500° C.~1000° C.;

and/or the time for the evaporation process, drying process, and roasting process is 2 min~5 min.

7. The preparation method according to claim 1, characterized in that the mass ratio of manganese element in the manganese iron phosphate precursor to the hydrochloric acid is 1:(5~20);

and/or the mass ratio of the iron element in the manganese iron phosphate precursor to the hydrochloric acid is 1:(5~20);

and/or the molar ratio of the sum of manganese element and iron element in the manganese iron phosphate precursor to the phosphorus element is 1:(0.9~1.1);

and/or the hydrochloric acid can also be nitric acid or sulfuric acid.

8. The preparation method according to claim 1, characterized in that the phosphorus source comprises at least one of ammonium phosphate, ammonium dihydrogen phosphate, diammonium hydrogen phosphate, phosphoric acid, iron phosphate, lithium phosphate, and lithium dihydrogen phosphate;

and/or the iron source comprises one or a combination of several of metal iron powder, metal iron sheet, metal iron ingot, red iron oxide, magnetite, ferric hydroxide, ferric sulfate, ferric nitrate, iron phosphate, ferrous oxalate, ferric oxide, ferric chloride, ferrous chloride, and their hydrates;

and/or the manganese source comprises one or a combination of several of the following: metal manganese powder, metal manganese sheet, metal manganese ingot, manganese monoxide, manganese dioxide, manganese tetraoxide, manganese sulfate, manganese nitrate, manganese phosphate, manganese oxalate, manganese chloride, and their hydrates.

* * * * *